W. C. KORTHALS-ALTES.
AUTOMATIC REGULATING SYSTEM.
APPLICATION FILED APR. 18, 1918. RENEWED OCT. 18, 1920.
1,365,505.  Patented Jan. 11, 1921.
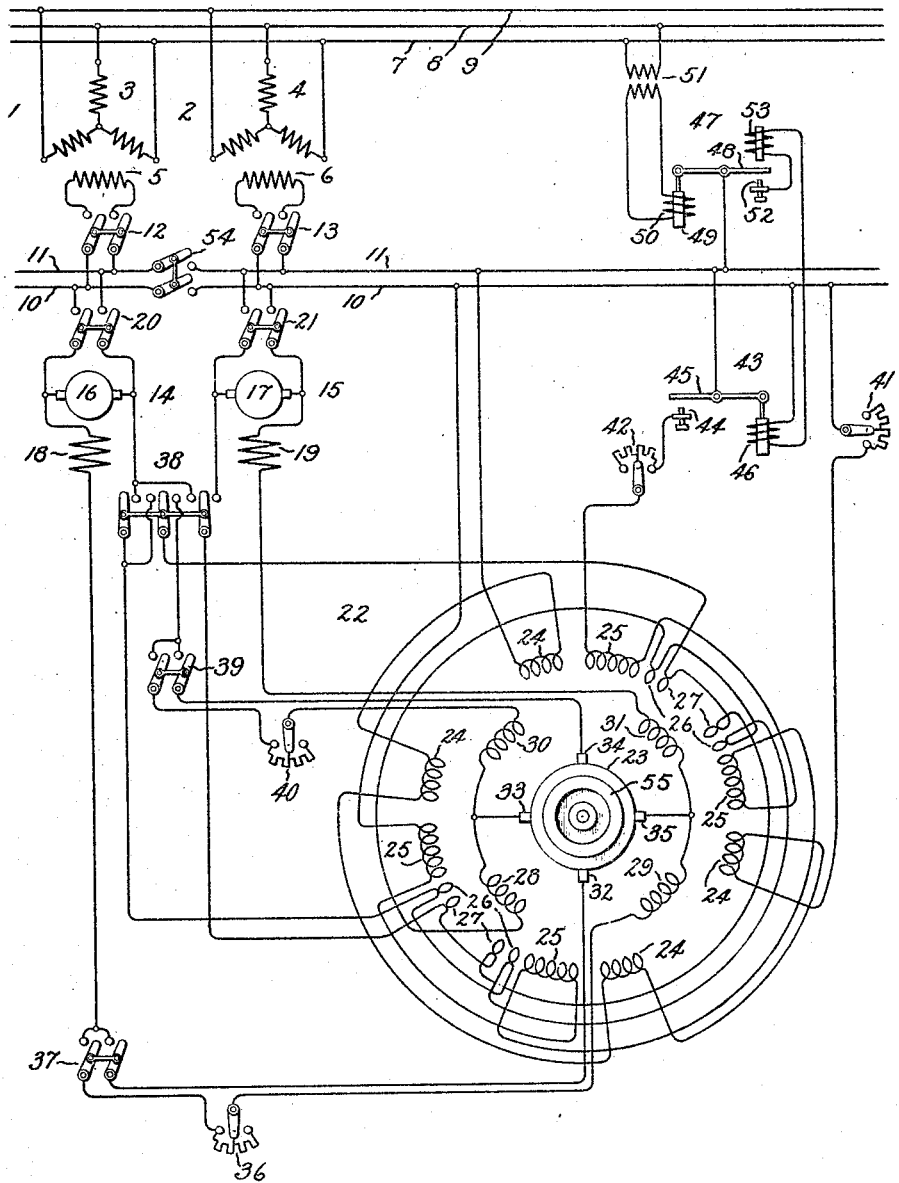
Inventor:
Willem C. Korthals-Altes,
by Albert G. Davis
  His Attorney.

UNITED STATES PATENT OFFICE.

WILLEM C. KORTHALS-ALTES, OF SCHENECTADY, NEW YORK, ASSIGNOR TO GENERAL ELECTRIC COMPANY, A CORPORATION OF NEW YORK.

AUTOMATIC REGULATING SYSTEM.

1,365,505. Specification of Letters Patent. Patented Jan. 11, 1921.

Application filed April 18, 1918, Serial No. 229,321. Renewed October 18, 1920. Serial No. 417,794.

*To all whom it may concern:*

Be it known that I, WILLEM C. KORTHALS-ALTES, a subject of the Queen of the Netherlands, residing at Schenectady, in the county of Schenectady, State of New York, have invented certain new and useful Improvements in Automatic Regulating Systems, of which the following is a specification.

My invention relates to automatic regulating systems for dynamo-electric machines and especially to automatic regulating systems of the kind wherein the regulation is effected by means of a motor which is connected to control by its counter electromotive force the excitation of the dynamo-electric machine, or machines, whose operation is to be regulated.

In the copending applications, Serial Nos. 221,046 and 221,047, filed March 7, 1918 by Louis W. Thompson and assigned to the same assignee as the present application, are disclosed automatic regulating systems of the kind referred to comprising, in combination with a dynamo-electric machine, a motor provided with an armature connected to control by its counter electromotive force the excitation of said dynamo-electric machine, a brake for opposing the rotation of said motor over its entire speed range, vibratory means for varying the excitation of said motor, and means for developing a magnetomotive force opposing the magnetomotive force of a main field winding of the motor. As disclosed in the aforesaid applications, the brake for opposing the rotation of the motor is structurally independent of the motors and each motor is employed to control the current in a single circuit only.

The principal object of my invention is to provide, in a system of the kind referred to, a dynamo-electric machine so constructed and connected that it combines the functions of a motor for controlling, by its counter electromotive force, the excitation of a main dynamo-electric machine and of a generator for producing a braking effect. Another object of my invention is to provide a dynamo-electric machine of this sort which shall be capable of controlling the currents in a plurality of independent circuits. Other objects of my invention will hereinafter appear.

In accordance with my invention, I provide, in combination with a main dynamo-electric machine, regulating means therefor comprising an auxiliary dynamo-electric machine provided with an armature connected to develop a counter electromotive force for controlling the excitation of said main machine and connected to generate a current for producing a braking effect and means for varying the counter electromotive force developed therein. When it is desired that the auxiliary dynamo-electric machine shall control the currents in a plurality of independent circuits, its armature is connected so that a plurality of independent circuits are completed therethrough. Other features of my invention will appear as this specification progresses.

My invention may best be explained by reference to the accompanying drawing, in the single figure of which my invention is diagrammatically shown as embodied in a regulating system in which one or more three-phase alternating current generators are excited by one or more exciters, and in which 1 and 2 denote alternating current generators having induced windings 3 and 4 and inducing windings 5 and 6. The induced windings 3 and 4 are connected to the mains 7, 8 and 9. The inducing windings 5 and 6 are adapted to be connected to the exciter buses 10 and 11 by means of the switches 12 and 13. Exciters 14 and 15, having armatures 16 and 17 and field windings 18 and 19, respectively, are arranged to be connected to the buses 10 and 11 by means of the switches 20 and 21. 22 denotes a dynamo-electric machine provided with an armature 23, main field windings 24 and 25, differential field windings 26 and 27, and compensating field windings 28, 29, 30 and 31. These windings are preferably arranged upon a common core, portions of which are traversed both by the flux set up by winding 24 and winding 25. The armature is provided with a plurality of brushes, or sets of brushes, 32, 33, 34 and 35. The brush 32 may be simultaneously connected through the field winding 18 of the exciter 14 to one side of the armature 16 thereof and through the adjustable resistance 36 and compensating winding 29 to the brush 35 by means of the double-pole single-throw switch 37. The other side of the armature 16 may be connected through one or both of the differential windings 26, 27 and the compensating winding 28 to the brush 33 by means of the double-throw switch 38. Similarly, one side of the armature 17 of the exciter 15 may be connected through the differential winding 27 to the brush 34 by means of the double-throw switch 38 and the double-pole single-throw switch 39. By means of the switch 39 the brush 34 may also be connected through the adjustable resistance 40 and compensating winding 30 to brush 33. The brush 35 is connected through the compensating winding 31 and field winding 19 of the exciter 15 to the other side of armature 17 thereof. The field winding 24 of the dynamo-electric machine 22 is connected through the adjustable resistance 41 across the exciter buses 10 and 11 and the excitation thereof will, therefore, vary with the voltage across said buses. The main field winding 25 is adapted to be connected through the adjustable resistance 42 across the exciter buses 10 and 11 by means of the relay 43, having a stationary contact 44, a movable contact 45, and means, comprising an operating winding 46, for actuating the movable contact 45. Energization and deënergization of the operating winding 46 is effected by means of the vibratory device 47 which comprises a movable contact 48, electrically connected to the exciter bus 11 and mechanically connected to a core 49, an operating winding 50, which is electrically connected, by means of a potential transformer 51, to the mains 7 and 8, for actuating the core 49, a stationary contact 52, adapted to coöperate with the movable contact 48 and connected, through the winding of an electromagnet 53, which operates as an anti-hunting device, and the operating winding 46 of the relay 43 to the exciter bus 10. A switch 54 is provided between portions of the buses 10 and 11. This switch will be closed if the exciter 14 alone is supplying current to the field windings 5 and 6 of the alternating current generators 1 and 2 and will be opened if both the exciters 14 and 15 are employed. The exciter 14 will be used, if it is necessary to use only one exciter, and in this event the switches 20 and 37 will be closed and the switch 38 closed in its left hand position. Under these conditions the differential field windings 27 and 26 are connected in series with the compensating winding 28, the set of brushes 33, the armature 23, the set of brushes 32, and the field winding 18 of the exciter 14 across the armature 16 thereof. If it is necessary to use both exciters the switches 20 and 37 and the switches 21 and 39 will be closed, the switch 54 opened, and the switch 38 closed in its right hand position. Under these conditions the differential field winding 26 is connected in series with the compensating winding 28, the set of brushes 33, the armature 23, the set of brushes 32 and the field winding 18 of the exciter 14 across the armature 16 thereof, and the differential field winding 27 is connected in series with the set of brushes 34, the armature 23, the set of brushes 35, the compensating winding 31, and the exciting winding 19 of the exciter 15 across the armature 17 thereof. The main field winding 25 sets up a field flux which coöperates with the current traversing the portions of the armature 23 between the brushes 32 and 33 or between the brushes 34 and 35, or both between the brushes 32 and 33 and the brushes 34 and 35 to cause the armature 23 to rotate. The counter electro-motive forces developed in the portions of the armature between the brushes 32 and 33 and between the brushes 34 and 35 are varied by varying the current in the field winding 25 by means of the relay 43 and the vibratory device 47. When the switch 37 is closed, the brushes 32 and 35 are connected through the resistance 36 and the compensating winding 29 and when the switch 39 is closed the brushes 33 and 34 are connected through the resistance 40 and the compensating winding 30. The field winding 24 sets up a flux which causes electromotive forces to be generated in the portions of the armature between the brushes 32 and 35 and between the brushes 33 and 34 which electromotive forces cause currents to flow through the external circuits comprising the resistances 36 and 40 so that a braking torque opposing the rotation of the armature is developed. The field windings 24 and 25 are in space quadrature, and are for this reason, so arranged that the flux set up by one does not materially interfere with the flux set up by the other. Hence the flux set up by the field winding 25 may be varied by varying the current therein, thereby varying the counter electro-motive forces, developed between the brushes 32 and 33 and between the brushes 34 and 35, which oppose the flow of current in the field windings 18 and 19, respectively, of the exciters 14 and 15, without materially affecting the flux effective to induce electromotive forces between the brushes 32 and 35 and between the brushes 33 and 34. The armature 23 may be designed to have sufficient inertia to prevent sudden changes in the speed thereof or a fly wheel 55 may be connected thereto to produce this effect.

The operation of my invention, as at present understood, is as follows:

First assume that it is necessary to operate only the exciter 14 in order to supply the required current to the buses 10 and 11, to which one or both of the inducing windings 5 and 6 of the generators 1 and 2 are connected by means of the switches 12 and 13. Switches 20, 37 and 54 will, therefore, be closed and the switch 38 be closed in its left hand position. If now it be assumed that the exciter 14 is driven by some means, not shown, the current which traverses the exciter winding 18 thereof will traverse the portion of the armature 23 of the auxiliary dynamo-electric machine 22, which is included between the brushes 32 and 33, the compensating winding 28, the differential field winding 26 and the differential field winding 27. If it be assumed that the contacts 44 and 45 of the relay 43 are closed, the main field winding 25 of the auxiliary dynamo electric machine 22 will be energized by current supplied thereto from the exciter buses 10 and 11 and will set up a flux which coöperates with the portion of the armature included between the brushes 32 and 33 so that the exciting current of the exciter 14, which traverses said armature portion, will cause the armature 23 to rotate. The main field winding 24 of the auxiliary dynamo-electric machine 22 will at the same time be supplied with current from the exciter buses 10 and 11, the value of which may be adjusted by the adjustable resistance 41, and will set up a flux which coöperates with the portion of the armature included between brushes 32 and 35 causing an electromotive force to be developed therein which will cause a breaking current to flow through the compensating winding 29 and the adjustable resistance 36. The counter electromotive force developed in the portion of the armature included between the brushes 32 and 33 controls the current in the field winding 18 of the exciter 14 and the value thereof is varied through the operation of the relay 43 which is controlled by the vibratory device 47. The rotation of the armature 23 is opposed by the coöperation of the current in the braking circuit, which comprises the portion of the armature included between the brushes 32 and 35, and the flux set up by the main field winding 24. The vibratory device 47, which responds to the voltage across the mains 7 and 8, operates to maintain its contacts 48 and 52 and the contacts 44 and 45 of the relay 43 in engagement such a proportion of the time that the flux set up by the main field winding 25 of the auxiliary dynamo-electric machine 22 keeps the counter electromotive force in the circuit of the field winding 18 of the exciter 14 at such values that the voltage maintained by the generator 1 across the mains 7 and 8 remains substantially constant.

If the voltage across said mains rises, the counter electromotive force developed in the armature portion between the brushes 32 and 33 is increased thereby decreasing the voltage of the exciter 14 and hence the voltage of the generator 1. Similarly if the voltage across the mains 7 and 8 decreases, the counter electromotive force developed in the portion of the armature between the brushes 32 and 33 is decreased thereby increasing the voltage of the exciter 14 and hence the voltage of the generator 1. The braking effect, due to the current traversing the portion of the armature between the brushes 32 and 35, limits the speed attained by the armature, while the inertia of the armature 23 and of the fly wheel 55, if a fly wheel be used, prevents sudden changes while permitting gradual changes in the speed of the armature. The field windings 26 and 27, which act differentially with respect to the field winding 25, tend to cause the flux to build down rapidly upon the deënergization of the field winding 25 through the disengagement of the contacts 44 and 45 and may even act to reverse the direction of the flux for short periods of time, in which case the portion of the armature included between the brushes 32 and 33 will develop an electromotive force tending to increase the current in the field winding 18.

If it be necessary to employ both of the exciters 14 and 15, switches 21 and 39 will also be closed, switch 54 be opened, and the switch 38 moved to the right. Under these conditions the portion of the armature included between the brushes 34 and 35 will coöperate with the flux set up by the field winding 25 to control the current in the field winding 19 of the exciter 15 and the portion of the armature included between the brushes 33 and 34 will coöperate with the flux set up by the field winding 24, to produce a braking effect. The differential field winding 26 is now connected in series with the field winding 18 of the exciter 14 and the differential field winding 25 is connected in series with the field winding 19 of the exciter 15. The differential field windings 26 and 27 are located in the circuits of the field windings of the different exciters simply in order that such circuits may have substantially like characteristics and their resultant differential effect remain substantially unchanged.

While I have herein shown and described one modification of my invention, I do not desire to be limited to the exact arrangement shown and described but seek to cover in the appended claims all those modifications which come within the true spirit and scope of my invention.

What I claim as new and desire to secure by Letters Patent of the United States, is:—

1. The combination with a main dynamo-electric machine of regulating means therefor comprising an auxiliary dynamo-electric machine provided with an armature, said armature being connected to develop a counter electromotive force for controlling the excitation of said main machine and being connected to generate a current for producing a braking effect, and means for varying the counter electromotive force developed therein.

2. The combination with a main dynamo-electric machine of regulating means therefor comprising an auxiliary dynamo-electric machine provided with an armature, said armature being connected to develop a counter electromotive force for controlling the excitation of said main machine and being connected to generate a current for producing a braking effect, and vibratory means for varying the counter electromotive force developed therein.

3. The combination with a main dynamo-electric machine of regulating means therefor comprising an auxiliary dynamo-electric machine provided with an armature, said armature being connected to develop a counter electromotive force for controlling the excitation of said main machine and being connected to generate a current for producing a braking effect, and with a field winding, and means for varying the current in said field winding.

4. The combination with a main dynamo-electric machine of regulating means therefor comprising an auxiliary dynamo-electric machine provided with an armature, said armature being connected to develop a counter electromotive force for controlling the excitation of said main machine and being connected to generate a current for producing a braking effect, and with a field winding, and vibratory means for varying the current in said field winding.

5. The combination with a main dynamo-electric machine, regulating means therefor comprising an auxiliary dynamo-electric machine provided with field windings, and an armature connected so that certain of said field windings develop a counter-electromotive force for controlling the excitation of said main machine and other of said windings generate a current for producing a braking effect, and means for varying the counter-electromotive force developed in said auxiliary machine.

6. The combination with a main dynamo electric machine, regulating means therefor comprising an auxiliary dynamo electric machine provided with field windings, and an armature connected so that certain of said field windings develop a counter-electromotive force for controlling the excitation of said main machine and other of said windings generate a current for producing a braking effect, and vibratory means for varying the current in the field windings developing the counter-electromotive force for controlling the excitation of said main machine.

7. The combination with a main dynamo-electric machine of regulating means therefor comprising an auxiliary dynamo-electric machine provided with an armature, a plurality of brushes coöperating therewith, some of which are connected so that the counter electromotive force developed in the portion of the armature included between them controls the excitation of said main machine and some of which are connected so that the electromotive force developed in the portion of the armature included between them causes a braking current to flow, a field winding for exciting said first mentioned portion, and a field winding for exciting said second mentioned portion, and means for varying the current in said first mentioned field winding.

8. The combination with a main dynamo-electric machine of regulating means therefor comprising an auxiliary dynamo-electric machine provided with an armature, a plurality of brushes coöperating therewith, some of which are connected so that the counter electromotive force developed in the portion of the armature included between them controls the excitation of said main machine and some of which are connected so that the electromotive force developed in the portion of the armature included between them causes a braking current to flow, a main field winding for exciting said first mentioned portion, and a differential field winding, means for connecting said first mentioned portion in series with said differential field winding, and means for varying the current in said main field winding.

9. The combination with a main dynamo-electric machine of regulating means therefor comprising an auxiliary dynamo-electric machine provided with an armature, a plurality of brushes coöperating therewith, some of which are connected so that the counter electromotive force developed in the portion of the armature included between them controls the excitation of said main machine and some of which are connected so that the electromotive force developed in the portion of the armature included between them causes a braking current to flow, compensating windings for said portions connected in series therewith, a main field winding for exciting said first mentioned portion, and a differential field winding, means for connecting said first mentioned portion in series with said differential field winding, and means for varying the current in said main field winding.

10. The combination with a generator having an exciting winding, of regulating means comprising an auxiliary dynamo-electric machine provided with an armature, a plurality of brushes coöperating therewith, some of which are connected so as to connect said exciting winding in series with the portion of the armature included between them and some of which are connected so as to complete a braking circuit through the portion of the armature included between them, a main field winding for setting up a flux with which said first mentioned armature portion coöperates to rotate the armature, and a main field winding for setting up a substantially independent flux with which said second mentioned armature portion coöperates to develop an electromotive force in said braking circuit, and means for controlling the current in said first mentioned field winding.

11. The combination with a generator having an exciting winding, of regulating means comprising an auxiliary dynamo-electric machine provided with an armature, a plurality of brushes coöperating therewith, some of which are connected so as to connect said exciting winding in series with the portion of the armature winding included between them and some of which are connected so as to complete a braking circuit through the portion of the armature included between them, compensating field windings for said armature portions, a main field winding for setting up a flux with which said first mentioned armature portion coöperates to rotate the armature, and a main field winding for setting up a substantially independent flux with which said second mentioned armature portion coöperates to develop an electromotive force in said braking circuit, means for supplying current to said field windings, and means for controlling the current in said first mentioned field winding.

12. The combination with a generator and an exciter therefor having an exciting winding, of regulating means comprising an auxiliary dynamo-electric machine provided with an armature, a plurality of brushes coöperating therewith, some of which are connected so as to connect said exciting winding in series with the portion of the armature winding included between them and some of which are connected so as to complete a braking circuit through the portion of the armature included between them, compensating field windings for said armature portions, a main field winding for setting up a flux with which said first mentioned armature portion coöperates to rotate the armature, a main field winding for setting up a substantially independent flux with which said second mentioned armature portion coöperates to develop an electromotive force in said braking circuit, means for supplying current to said field windings, and a differential field winding for opposing the magnetomotive force of said first mentioned main field winding, means for connecting said differential field winding in series with said first mentioned armature portion, means comprising an anti-hunting device and responsive to electrical conditions of said generator, for controlling the current in said first mentioned field winding, and means for preventing sudden changes in the speed of said armature.

13. The combination with a plurality of dynamo-electric machines having independent exciting circuits, of regulating means therefor comprising an auxiliary dynamo-electric machine provided with an armature, a plurality of brushes coöperating therewith, some of which are connected so that the portions of the armature between them are located in said independent circuits and some of which are connected so that the portions of the armature between them are located in independent braking circuits, and a main field winding for exciting said first mentioned portions, and means for varying the current in said field winding.

14. The combination with generators having exciting windings, of exciter buses connected to said exciting windings, exciters provided with field windings and connected to said exciter buses, regulating means for said generators comprising an auxiliary dynamo-electric machine provided with an armature, a plurality of brushes coöperating therewith, some of which are connected so as to connect the field winding of one of said exciters in series with the portion of the armature included between them, some of which are connected so as to connect the field winding of another of said exciters in series with the portion of the armature included between them, and some of which are connected so as to complete braking circuits through the portions of the armature included between them, a main field winding for setting up a flux with which the armature portions connected in series with the field windings of said exciters coöperate to rotate the armature, and a main field winding for setting up a substantially independent flux with which the portions of the armature through which the braking circuits are completed coöperate to develop electromotive forces in said braking circuits, means for supplying current to said main field windings, and means responsive to an electrical condition of said generator for controlling the current in said first mentioned field winding.

In witness whereof I have hereunto set my hand this 16th day of April, 1918.

WILLEM C. KORTHALS-ALTES.